INVENTOR.
FRANCIS W. WINN

INVENTOR.
FRANCIS W. WINN

United States Patent Office 2,776,189
Patented Jan. 1, 1957

2,776,189

NITRIC ACID RECOVERY AND PURIFICATION

Francis W. Winn, San Gabriel, Calif., assignor, by mesne assignments, to the United States of America as represented by the United States Atomic Energy Commission Application December 3, 1954, Serial No. 473,059

12 Claims. (Cl. 23—158)

This invention relates to a method for recovering nitric acid by the absorption of nitrogen dioxide or peroxide ($NO_2$) in water and/or the concentration of dilute acid by fractional distillation, and more particularly to an improvement in the methods for the removal of an impurity of chloride ions which frequently may be present. The recovery of nitric acid is economically important in certain nitration or extraction processes utilizing nitric acid, especially in ore refining. This invention is to be described specifically with reference to a process for extracting uranium from ores or ore concentrates by steps which include the digestion of the feed material with nitric acid and extraction of the uranyl nitrate formed with a selective solvent; in this process provision is made for the treatment of the raffinate liquid to recover the nitrate values.

Figure 1:
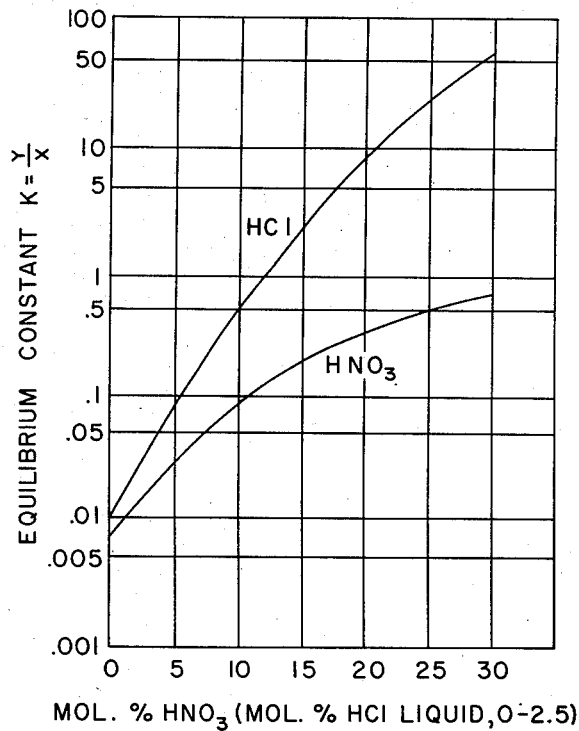
Figure 2:
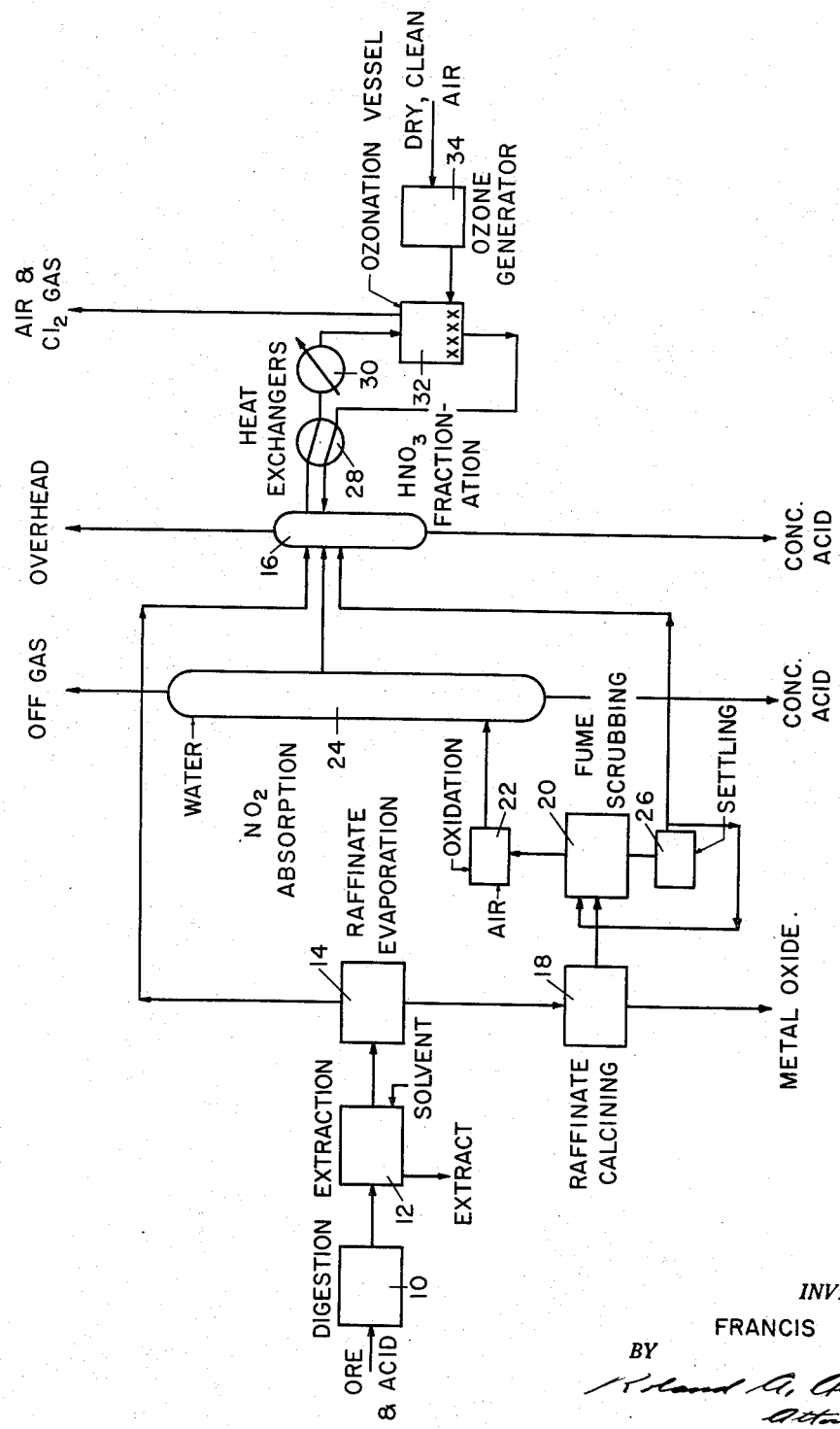

The invention will be described with reference to the drawings in which:

Fig. 1 is a graph showing the vapor-liquid equilibrium constants for HCl and for $HNO_3$ as a function of the $HNO_3$ concentration in the $HCl$-$HNO_3$-$H_2O$ system at 1 atmosphere; and Fig. 2 is a diagrammatic flow sheet of a typical process employing the present method.

The presence of chloride ions in nitric acid may produce a corrosive mixture depending primarily on the concentration of the chloride ion, the strength of the nitric acid, the particular material of construction used and the temperature. For example, studies have shown that high corrosion rates, 0.0702 to 0.1176 inch per year, are to be expected in 40 to 55 weight percent $HNO_3$ containing 0.5 weight percent chloride at the boiling point of these mixtures under 1 atmosphere pressure. It has been found that the chloride ion concentration may build up at certain points in the nitric acid recovery operation to concentrations that are extremely difficult to handle with available materials and methods of construction.

Typically, when nitrate values are to be recovered from a raffinate liquor that contains metal nitrates in aqueous nitric acid, the liquor is evaporated to produce a dilute acid solution and the remaining solids are calcined to produce nitrogen oxides. The dilute acid is fractionally distilled to produce concentrated acid while the nitrogen oxides, after such treatment as is necessary, are absorbed in water to produce concentrated acid. In such a process, the chloride ion concentration may build up in the absorption column and in the fractionating column to values that are many times greater than the concentation in the raffinate liquid taken for processing to recover nitrate values. This will be seen more clearly by reference to Fig. 1 which shows the distribution of the chloride between the vapor and liquid phases of the $HNO_3$-$H_2O$-$HCl$ system at 1 atmosphere.

In Fig. 1, $$K = \frac{\text{mol concn. HCl in vapor}}{\text{mol concn. HCl in liquid}}$$

and is plotted against increasing mol concentration of $HNO_3$ in the liquid phase along the fractionation column. It may be noted in Fig. 1 that the equilibrium constant of HCl between the vapor and liquid phases is very low at low nitric acid concentrations and very high at high nitric acid concentrations. Thus, in the fractional distillation of nitric acid the hydrochloric acid tends to concentrate in the liquid phase in the upper part of the distillation column where the acid concentration is low, i. e., to remain in the liquid nitric acid rather than go off with the water vapor there. In the lower part of the column, on the other hand, the hydrochloric acid tends to be expelled from the liquid phase as a result of the high concentration of acid there, i. e., to enter the vapor phase rather than to be removed with the liquid nitric acid bottoms product. The result is a very high internal recycle of hydrochloric acid resulting in a large increase in its concentration at a position between the top and bottom of the column; high chloride ion concentrations are found in the 5 to 25 weight percent nitric acid zone and the highest concentrations are found in the 10 to 15 weight percent nitric acid zone. The chloride ion concentration increases in this way to an equilibrium concentration which may be as high as or even higher than, a thousand times its concentration in the feed introduced into the fractionator. An equilibrium concentration of about 4 percent by weight may be produced in concentrating nitric acid containing what might be considered a negligible concentration, of the order of a fraction of a thousandth of a percent.

The nitric acid-water system forms a maximum-boiling azeotrope containing 67.5 weight percent nitric acid and boiling at 251–252° F. at 1 atmosphere pressure. Thus it is convenient to operate a fractionator to produce acid containing 50–60 weight percent $HNO_3$ boiling at about 242–249° F. at 1 atmosphere pressure, as the bottoms product. With such operation, after chloride concentration has reached its high equilibrium value in the fractionator, most of the entering chloride will be taken overhead. Because of the high equilibrium chloride concentration (as high as about 4 weight percent) this in itself causes a serious corrosion problem. If the fractionating column is operated to produce 40 weight percent nitric acid, most of the chloride, after the equilibrium build-up, is removed in the acid bottoms product. Under the latter condition and where the nitric acid is recycled to ore digestion or other process operations, a very high concentration of chloride could build up throughout the ore refinery. That is, the latter type of operation could, by leaving the chloride in the recovered nitric acid and recycling it, increase the corrosion hazard by spreading it wherever the nitric acid is recycled.

In an absorption tower, the chloride ion accumulates to relatively high concentrations at about 20 to 25 weight percent nitric acid and to the highest concentrations at about 22 to 23 percent acid. The mechanisms that have been postulated to explain this chloride accumulation involve the reaction of NO and $NO_2$ to form nitrosyl chloride (NOCl) which is stable in nitric acid concentrations weaker than about 25 weight percent. In stronger acid, the NOCl decomposes. This results in NOCl refluxing down the absorption tower to about the 25 weight percent nitric acid zone, decomposing in this zone of higher acid concentration, and allowing chlorides to ascend the tower again to reform NOCl. This internal recycle also results in a build-up in chloride ion concentration.

It is therefore an object of the invention to prevent corrosion of equipment used in the recovery of nitric acid by absorption and by fractionation.

Another object is to remove chloride ion from nitric acid produced and/or processed in such a recovery method, by means which are efficient and inexpensive.

Another object is to achieve such removal of chloride ions without any loss of nitric acid.

A further object is to remove chloride ions from nitric acid undergoing fractionation to produce pure, concentrated acid, without causing any substantial change in the normal functioning of the fractionating column.

In a process where both the methods of fractionation of nitric acid and of absorption of nitrogen oxides are used to recover nitric acid, it is an object of this invention to prevent chloride accumulation in both methods using a single installation of chloride removal equipment.

The method of this invention essentially comprises withdrawing a portion of the nitric acid undergoing concentration in the fractionating column, treating the withdrawn acid with ozone to oxidize the chloride ions contained therein to chlorine gas, separating the chlorine gas and returning the purified acid to the fractionation column. Suitably these steps are carried out in a continuous manner such that there is no interference with the normal operation of the column. Preferably a side-stream of liquid nitric acid is withdrawn from the fractionator at a point of relatively high chloride ion concentration, e. g., 5 to 25 weight percent nitric acid or better 10 to 15 weight percent acid, and the purified acid is returned to the column at a point just below the point of withdrawal and at a flow rate equal to the withdrawal rate. The withdrawn nitric acid is preferably cooled to a moderate temperature of about 160° F. and ozonation is carried out at the latter temperature, the purified acid is heated before reintroduction into the fractionator. To save heat, the returning cooler liquid may be heated by the withdrawn hot material which is thereby cooled, as in a conventional tube-pass and shell heat exchanger.

The method of this invention has particular application to a process in which uranium ores or concentrates thereof are digested in aqueous nitric acid to form a slurry and the nitric acid digest slurry is extracted with a selective organic solvent to produce an organic extract of uranyl nitrate and a raffinate liquid containing other metal nitrates in a medium of nitric acid. To produce concentrated nitric acid from the residues of this method, i. e., from the raffinate, the raffinate liquid is evaporated and the nitric acid vapors are fed to a nitric acid fractionator where 55 to 60 percent nitric acid is produced. The concentrated raffinate is then calcined to produce metal oxides and nitrogen oxides. The nitrogen oxides are scrubbed, then oxidized to convert any lower oxides to nitrogen dioxide, and are then absorbed in water to produce concentrated nitric acid. The scrub liquid is also introduced into the fractionator. In such a process employing both an absorber and a fractionator, the present method is made still more effective and economical by withdrawing a side-stream of chloride-rich acid from the absorber, feeding it into the fractionator, and treating the side-stream from the latter with ozone. When the recovery system provides only for absorption of nitrogen oxide gas in water and not for distillation of dilute acid, a portion of the nitric acid produced in the absorber may be withdrawn, treated with ozone in the manner described and then returned to the absorber.

As shown in Figure 2, uranium ore or an ore concentrate is fed to the digester 10 where it is mixed with aqueous nitric acid to form a slurry. The slurry is brought into countercurrent contact with a selective solvent for the uranium in the extraction column 12 to transfer the uranium to the solvent. Using a highly selective solvent for the uranium produces a raffinate containing less than a few hundredths of a gram of uranium per liter, although the presence of uranium would not interfere with the present process. In such an extraction, the nitric acid serves to dissolve and oxidize the uranium and to enhance the selectivity of the solvent. The result is to produce a raffinate substantially free of uranium but containing substantially all the other components of the ore, particularly the metals as nitrates, in a medium of aqueous nitric acid which may be of the order of 3 to 4 normal. In instances when the raffinate contains radioactive substances, as when the ore treated is pitchblende, the raffinate may be filtered to remove the insoluble radium-bearing materials. Clear raffinate is ready for further processing.

In the raffinate treatment free nitric acid is recovered by evaporation and is then concentrated by fractionation to produce about 55–60 weight percent acid which may be re-used for the ore refining described above. In addition, fixed nitrogen present in the metal nitrates is released by decomposing the nitrates to form the oxides of nitrogen which are then recovered by absorption in water to produce about 50–55 weight percent acid which also may be re-used.

Recovery of free nitric acid is accomplished by feeding the raffinate liquid into an evaporator 14 which may be of the forced circulation type, and evaporating the feed to produce an overhead condensate which is approximately 23% in nitric acid. In the evaporation water and free nitric acid are substantially completely removed from the raffinate. The acid evaporator condensate is introduced into the fractionator 16 at a point where acid of the same concentration is handled, as shown in Fig. 2.

The concentrated evaporator bottoms, which consists essentially of a liquid mixture of hydrated metal nitrates, is pumped to a recycle spray calciner 18 and dehydrated and denitrated as more fully explained in an application of Martin Kapp and William W. Weinrich, Ser. No. 393,249, filed November 19, 1953, and now Patent No. 2,757,072 granted July 31, 1956. As there described, the hot liquid mixture of metal nitrates is atomized and mixed with hot recirculated gases at about 1200° F. to yield steam, nitrogen oxides and metal oxide particles. The metal oxide product is removed and sent to storage. A portion of the gases produced in the spray calciner is withdrawn as product. The gases (to which may be added nitrogen oxide gases of generally similar composition obtained from the digestion of the ores and from the denitration of uranyl nitrate) are scrubbed and cooled by contact with dilute nitric acid in a gas scrubber 20. The scrub liquid cools the gases to about 100° F., condenses part of the moisture and removes any solids present in the gases. The cooled, scrubbed gas stream containing about 23 volume percent of NO plus $NO_2$, is flowed first through an oxidation chamber 22 in which the NO present is oxidized by air to $NO_2$, and then to an absorption column 24 where $NO_2$ is absorbed in water flowing countercurrently to produce about 50–55 weight percent nitric acid. The dilute acid scrub liquid is received in a settler 26 where the solids drop out. Most of the scrub liquid is recirculated to the gas scrubber 20 and part (equivalent to the moisture condensed in the scrubber) is fed to the nitric acid fractionator 16. The absorber 24 and the fractionator 16 may suitably be equipped with bubble cap trays. Thus, the fractionator 16 receives the nitric acid condensate from the raffinate evaporator 14 and dilute nitric acid from the gas scrubber 20 and, as will presently be explained, it also receives a liquid side-stream from the $NO_2$ absorption column 24.

The distribution of the chloride ion impurity in the above described process, is as follows. Substantially all of the chloride ion contained in the ore and reagent used therewith, finds its way into the raffinate. About one-half of the raffinate content goes off with the evaporator overhead and enters the fractionation column. The other half remains with the concentrated metal nitrates and upon calcining, about three-fifths of this accompanies the nitrogen oxides. Most of the latter enters the fractionation column with the scrub condensate and a small amount enters the absorber with the scrubbed gases. Thus, about 80° of the chloride ion derived from the feed material follows the acid through the raffinate treatment and eventually is found in the nitric acid fractionation column.

According to this invention, the chloride ion impurity is removed in the following manner. Preferably, operation is carried out continuously but if desired it may be carried out batchwise or semi-continuously. A sidestream of liquid nitric acid is bled off from the absorption column 24 at a point where the chloride ion content is at or near its maximum concentration, e. g., at about 22-23% nitric acid, and this stream is fed to the fractionator 16, as shown in Fig. 2. This effectively keeps the chloride ion concentration in the absorption zone at a low value and transfers it to the fractionation zone. The fractionator concurrently receives nitric acid from the raffinate evaporator 14 and a dilute acid stream from the scrubber 20 handling nitrogen oxide gases, which contain most of the chloride ion impurity. The fractionator 16 is operated to produce essentially water vapor as the overhead and about 55-60% nitric acid as the bottoms product.

A side-stream of liquid nitric acid is taken off from the fractionation column 16 at a point where the chloride ion concentration is at or near its maximum, this being within the range of 5-25% nitric acid and preferably 10-15 weight percent acid. The stream from the fractionator is cooled to about 160° F. in two stages of heat transfer: in a first heat exchanger 28 countercurrently with the chloride-free nitric acid being returned to the fractionator and in a second heat exchanger 30 with fresh water. After being cooled, the nitric acid stream flows into an ozonation tank 32 having a considerable liquid hold-up time. The tank 32 is equipped with sparging facilities by means of which an ozone-air mixture is introduced into the nitric acid solution. The ozone may be generated in conventional manner by passing an electric discharge through air in a suitable generator 34, such a method generally producing a mixture of about 1 weight percent of ozone in air. Chlorine is formed from the oxidation of chloride by ozone. The ozonation vessel discharges an overhead of air and chlorine gas and a bottoms product consisting essentially of purified nitric acid. This is pumped back through the heat exchanger 28 and into the fractionation column 16 at a point just below that from which the acid had been withdrawn, for example, onto the next lower tray of a bubble-cap tower.

As one example, in order to remove 24 lbs./day of $Cl^-$ from a fractionator to which 20,000 lb./hr. of feed nitric acid is introduced, 250 lb./min. of 15 weight percent nitric acid containing about .031% $Cl^-$ is withdrawn and the purified acid is returned to the fractionator at the same rate with a concentration of about .024% $Cl^-$. The withdrawn acid is contacted, to effect purification, at about 160° F. with 1 weight percent of ozone in air for about 2 hours in an ozonation vessel providing sufficient liquid hold-up. Under these conditions, about 60 lb./day of $O_3$ are used. This continuous removal of chloride effectively prevents the building up of hazardous concentrations of chloride ion.

Experiments were carried out in which ozone was passed through solutions of nitric acid containing chloride ions, and Table I shows the effectiveness of the treatment under several different sets of conditions.

TABLE I

*Oxidation of chloride ion in nitric acid using ozone*

| Run No. | 9 | 10 | 12 | 13 | 35 | 36 | 37 |
|---|---|---|---|---|---|---|---|
| Gas Rate, ml./min. | 710 | 710 | 710 | 710 | 164 | 340 | 340 |
| $O_3$ Conc., mg./cu. ft. | 740 | 830 | 830 | 740 | 550 | 210 | 556 |
| $O_3$ Rate mg./min. | 18.0 | 20.8 | 20.8 | 18.6 | 3.2 | 2.5 | 6.7 |
| Temperature, ° C. | 70 | 70 | 56 | 50 | 70 | 71 | 71 |
| Solution Vol., ml. | 400 | 400 | 400 | 400 | 500 | 500 | 500 |
| Acid Conc. wt. percent | 20 | 20 | 20 | 20 | 20 | 20 | 10 |
| $Cl^-$ Concentration wt. percent @ elapsed time, min.: | | | | | | | |
| 0 | .01 | .05 | .05 | .01 | .0515 | .05 | .0484 |
| 19 | | .03 | .04 | | | | |
| 22 | .008 | | | | | | |
| 44.5 | | | | .008 | | | |
| 75 | | | .015 | | | | |
| 77 | | | | | | | .0352 |
| 87.5 | | .015 | | | | | |
| 90 | | | | .008 | | | |
| 133 | .004 | | | | | | |
| 134 | | | | .005 | | | |
| 156 | | | | | .0164 | | |
| 178 | .0001 | | .01 | | | | |
| 179 | | .003 | | | | | |
| 193.5 | | | .005 | | | | |
| 200 | | | | | | .0222 | |
| 222 | .0001 | | | | | | |
| 224 | | | | | | | |
| 237 | | | | | | | .0172 |
| 278 | | .001 | | | | | |
| 468 | | | | | .0003 | | .0137 |
| 550 | | | | | .0003 | | |
| 600 | | | | | | .0010 | |
| 962 | | | | | | .0002 | |

In performing the treatment of the nitric acid sidestream with ozone, an economic balance should be struck among the factors affecting the treatment, particularly the ozone concentration, the nitric acid temperature, the absolute pressure and the time the liquid is treated with ozone. Increasing the ozone concentration and increasing the pressure in the ozonation vessel or either may be used to increase the reaction rate, and thereby reduce hold-up time, reduce the amount of ozone required or, by compromising, both. These factors depend to a great extent on the design of the ozone generator. Similarly, increasing the temperature also increases the rate of reaction. However, too high a temperature causes a loss of nitric acid with the exhaust gas and may also cause the decomposition of ozone without reacting with chloride ion.

Instead of using air as the source of ozone, oxygen-enriched air or pure oxygen may be used.

It will thus be seen that the method of the present invention effectively removes a chloride ion impurity which may be present in the production of concentrated nitric acid by fractionation and/or absorption, especially as may be carried out in connection with the refining of ores. Thus the invention is of value in preventing corrosion in equipment used for these purposes, whereby such processes can be made practical and workable. A specific advantage of the arrangement shown is that the chloride ultimately accumulates in one location, the fractionator, and thus can be removed without the necessity of duplicate removal facilities.

Since many embodiments might be made of the present invention and since many changes might be made in the embodiment described, it is to be understood that the foregoing description is to be interpreted as illustrative only and not in a limiting sense.

I claim:

1. In a method of recovering nitric acid by fractional distillation from dilute aqueous acid containing chloride ions, the improvement for removing small traces of chloride ions from the acid which comprises the steps of continuously withdrawing a liquid side-stream of nitric acid from the fractionation zone at a point of relatively high chloride ion concentration, continuously treating the withdrawn acid with ozone to oxidize chloride ions to chlorine gas, continuously venting the chlorine gas and continuously returning a purified liquid stream of nitric acid to the fractionation zone at a point below and close to the point of withdrawal.

2. The method as set forth in claim 1 in which the withdrawn acid is cooled to approximately 160° F. and is treated with ozone at that temperature, and the purified acid is re-heated before being returned to the fractionation zone; and in which the rate of withdrawal and rate of return of acid are approximately the same.

3. In a method of recovering nitric acid by fractional distillation from dilute aqueous acid containing chloride ions, the improvement for removing small traces of chloride ions from the acid which comprises the steps of continuously withdrawing a liquid side-stream containing about 5 to 25% by weight nitric acid from the fractionation zone, continuously treating the withdrawn acid with ozone to oxidize chloride ions to chlorine gas, continuously venting the chlorine gas and continuously returning a purified liquid stream of nitric acid to the fractionation zone at a point below and close to the point of withdrawal.

4. In a method of recovering nitric acid by fractional distillation from dilute aqueous acid containing chloride ions, the improvement for removing small traces of chloride ions from the acid which comprises the steps of continuously withdrawing a liquid side-stream containing about 10 to 15% by weight nitric acid from the fractionation zone, continuously treating the withdrawn acid with ozone to oxidize chloride ions to chlorine gas, continuously venting the chlorine gas and continuously returning a purified liquid stream of nitric acid to the fractionation zone at a point below and close to the point of withdrawal.

5. In a method for the recovery of nitrate values contaminated with small traces of chloride ions, in the form of pure, concentrated nitric acid, in which $NO_2$ is absorbed in water to form concentrated nitric acid and in which dilute nitric acid is concentrated in a fractional distillation zone, the improvement which comprises the steps of withdrawing a portion of the nitric acid from the absorption zone and introducing the same into the fractionation zone, withdrawing a portion of the nitric acid from the fractionation zone and passing it to an oxidation zone, treating the latter withdrawn acid in the oxidation zone with ozone to oxidize chloride ions to chlorine gas, removing the chlorine gas and returning the purified nitric acid directly to the fractionation zone without passing it through the absorption zone.

6. In a method for the recovery of nitrate values contaminated with small traces of chloride ions, in the form of pure, concentrated nitric acid, in which $NO_2$ is continuously absorbed in water to form concentrated nitric acid and in which dilute nitric acid is concentrated in a fractional distillation zone, the improvement which comprises the steps of continuously withdrawing a liquid side-stream containing about 20 to 25% by weight nitric acid from the absorption zone and introducing the same into the fractionation zone, continuously withdrawing a liquid side-stream of nitric acid from the fractionation zone at a point of relatively high chloride ion concentration and passing it to an oxidation zone, continuously treating the latter withdrawn acid in the oxidation zone with ozone to oxidize chloride ions to chlorine gas, continuously venting the chlorine gas and continuously returning the purified liquid stream of nitric acid directly to the fractionation zone without passing it through the absorption zone.

7. In a method for the recovery of nitrate values contaminated with small traces of chloride ions, in the form of pure, concentrated nitric acid, in which metal nitrates in a medium of aqueous nitric acid are boiled down and the vapor comprising nitric acid is introduced into a fractional distillation zone wherein it undergoes concentration, the metal nitrates remaining from the evaporation step are calcined to produce metal oxides and nitrogen oxides and the nitric acid is recycled to produce the metal nitrates $NO_2$ is absorbed in water to form concentrated nitric acid, the method of preventing the accumulation of chloride in the steps of the process which comprises the steps of withdrawing a portion of the nitric acid from the absorption zone and introducing the same into the fractionation zone, withdrawing a portion of the nitric acid from the fractionation zone and passing it to an oxidation zone, treating the latter withdrawn acid in the oxidation zone with ozone to oxidize chloride ions to chlorine gas, separating the chlorine gas, returning the purified nitric acid directly to the fractionation zone without passing it through the absorption zone and recycling the concentrated nitric acid produced in said fractionation zone to produce said metal nitrates.

8. In a method for the recovery of nitrate values contaminated with small traces of chloride ions, in the form of pure, concentrated nitric acid, in which metal nitrates in a medium of aqueous nitric acid are continuously boiled down and the vapor comprising nitric acid is continuously introduced into a fractional distillation zone wherein it undergoes concentraton, the metal nitrates remaining from the evaporation step are continuously calcined to produce metal oxides and nitrogen oxides, $NO_2$ is continuously absorbed in water to form concentrated nitric acid and the concentrated nitric acid is recycled to produce said metal nitrates, the method of preventing accumulation of chloride in the steps of the process which comprises the steps of continuously withdrawing a liquid side-stream of nitric acid from the absorption zone at a point of relatively high chloride ion concentration and continuously introducing the same into the fractionation zone, continuously withdrawing a liquid side-stream of nitric acid from the fractionation zone at a point of relatively high chloride ion concentration and passing it to an oxidation zone, continuously treating the latter withdrawn acid in the oxidation zone with ozone to oxidize chloride ions to chlorine gas, continuously separating the chlorine gas, continuously returning a purified liquid stream of nitric acid directly to the fractionation zone without passing it through the absorption zone and recycling the concentrated nitric acid produced in said fractionation and absorption zones to produce said metal nitrates.

9. In a method for the recovery of nitrate values contaminated with small traces of chloride ions, in the form of pure, concentrated nitric acid, in which metal nitrates in a medium of aqueous nitric acid are continuously boiled down and the vapor comprising nitric acid is continuously introduced into a fractional distillation zone wherein it undergoes concentraton, the metal nitrates remaining from the evaporation step are continuously calcined to produce metal oxides and nitrogen oxides, the nitrogen oxides thus obtained are continuously scrubbed with dilute nitric acid, scrub liquid is continuously introduced into the fractionation zone, $NO_2$ is continuously absorbed in water to form concentrated nitric acid and the concentrated nitric acid is recycled to produce said metal nitrates, the method of preventing accumulation of chloride in the steps of the process which comprises the steps of continuously withdrawing a liquid side-stream of nitric acid from the absorption zone at a point of relatively high chloride ion concentration and continuously introducing the same into the fractionation zone, continuously withdrawig a liquid side-stream of nitric acid from the fractionation zone at a point of relatively high chloride ion concentration and passing it to an oxidation zone, continuously treating the latter withdrawn acid in the oxidation zone with ozone to oxidize chloride ions to chlorine gas, continuously separating the chlorine gas, continuously returning a purified liquid stream of nitric acid directly to the fractionation zone without passing it through the absorption zone and recycling the concentrated nitric acid produced in said absorption and fractionation zones to produce said metal nitrates.

10. In a method for the recovery of nitrate values contaminated with small traces of chloride ions, in the form of pure, concentrated nitric acid, in which metal nitrates in a medium of aqueous nitric acid are continuously boiled down and the vapor comprising nitric acid is continuously introduced into a fractional distillation zone wherein it undergoes concentration, the metal nitrates remaining from the evaporation step are continuously calcined to produce metal oxides and nitrogen oxides, the nitrogen oxides are continuously scrubbed with dilute nitric acid, the nitrogen oxides are continuously oxidized to convert any lower valence oxides present to $NO_2$, the scrub liquid is continuously introduced into the fractionation zone, the $NO_2$ is continuously absorbed in water to form concentrated nitric acid and the concentrated nitric acid is recycled to produce said metal nitrates, the method of preventing accumulation of chloride in the steps of the process which comprises the steps of continuously withdrawing a liquid side-stream of nitric acid from the absorption zone at a point of relatively high chloride ion concentration and continuously introducing the same into the fractionation zone, continuously withdrawing a liquid side-stream of nitric acid from the fractionation zone at a point of relatively high chloride ion concentration and passing it to an oxidation zone, continuously treating the latter withdrawn acid in the oxidation zone with ozone to oxidize chloride ions to chlorine gas, continuously separating the chlorine gas, continuously returning a purified liquid stream of nitric acid directly to the fractionation zone without passing it through the absorption zone and recycling the concentrated nitric acid produced in said absorption and fractionation zones to produce said metal nitrates.

11. In a method of producing nitric acid by absorbing $NO_2$ in water in an absorption zone, and concurrently distilling dilute nitric acid in a fractional distillation zone in parallel with said adsorption zone, the improvement of removing an impurity of chloride ions from the acid which comprises the steps of continuously passing a portion of the nitric acid from the absorption zone to an oxidation zone, continuously treating the withdrawn nitric acid in the oxidation zone with ozone to convert chloride ions to chlorine gas, continuously removing the chlorine gas so produced and continuously returning the purified nitric acid directly to the distillation zone without passing it through the absorption zone.

12. In a method of producing nitric acid by absorbing $NO_2$ in water, the improvement of removing an impurity of chloride ions from the acid which comprises the steps of continuously scrubbing a gas containing oxides of nitrogen including $NO_2$ with dilute nitric acid, continuously oxidizing the scrubbed gases to convert any lower valence oxides to $NO_2$, continuously introducing the $NO_2$ thus obtained into the absorption zone, continuously removing a liquid side-stream of nitric acid from the absorption zone at a point of high chloride ion accumulation and introducing said stream into a fractionation zone, continuously introducing the scrub liquid into said fractionation zone, continuously removing a liquid side-stream from said fractionation zone at a point of relatively high chloride ion concentration to an oxidation zone, continuously treating the latter withdrawn acid in the oxidation zone with ozone to convert chloride ions into chlorine gas, continuously removing the chlorine gas so produced and continuously returning the purified nitric acid directly to the fractionation zone without passing it through the absorption zone.

References Cited in the file of this patent
UNITED STATES PATENTS

| 982,466 | Blackmore | Jan. 24, 1911 |
| 1,310,943 | Datto | July 22, 1919 |
| 2,098,953 | Christensen | Nov. 16, 1937 |
| 2,185,580 | Beekhuis | Jan. 2, 1940 |
| 2,681,268 | Nossen | June 15, 1954 |